| United States Patent [19] | [11] Patent Number: 4,913,920 |
|---|---|
| Ferrero | [45] Date of Patent: Apr. 3, 1990 |

[54] METHOD FOR THE MANUFACTURE OF CONFECTIONERY WAFER PRODUCTS

[75] Inventor: Pietro Ferrero, Bruxelles, Belgium

[73] Assignee: Ferrero S.p.A., Alba, Italy

[21] Appl. No.: 331,186

[22] Filed: Mar. 31, 1989

Related U.S. Application Data

[62] Division of Ser. No. 109,151, Oct. 16, 1987, Pat. No. 4,854,228.

[30] Foreign Application Priority Data

Oct. 29, 1986 [IT] Italy .............................. 67814 A/86

[51] Int. Cl.⁴ ............................................. A23G 3/20
[52] U.S. Cl. ..................................... 426/283; 426/512
[58] Field of Search ................ 426/283, 512; 99/450.1, 99/450.6, 450.7; 249/117, 120, 123, 124; 425/89, 126.1

[56] References Cited

U.S. PATENT DOCUMENTS 1,814,485  7/1931  Moss ..................................... 426/283
4,421,773  12/1983  Akutagawa ........................... 426/512

FOREIGN PATENT DOCUMENTS 70766  1/1976  Australia ............................. 99/450.1

Primary Examiner—George Yeung
Attorney, Agent, or Firm—Bernard, Rothwell & Brown

[57] ABSTRACT

The device is intended for the manufacture of food products made by joining together first and second wafers, in which at least the first wafer includes a substantially flat core portion with a region having a distinct perimeter in which cell parts are provided for receiving a filling. The device comprises a peripheral frame having an end edge for supporting the wafer provided with cell parts in correspondence with said distinct perimeter. A plurality of clamping members associated with the peripheral frame are able to pivot relative to the frame between a closed position in which they extend at least partially to cover the end edge and can clamp the first wafer and/or the two joined wafers on the device, and an open position, in which it allows wafers to be inserted into and removed from the device itself.

8 Claims, 2 Drawing Sheets

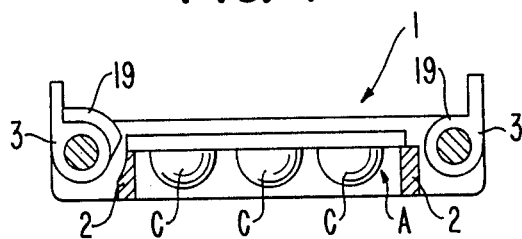
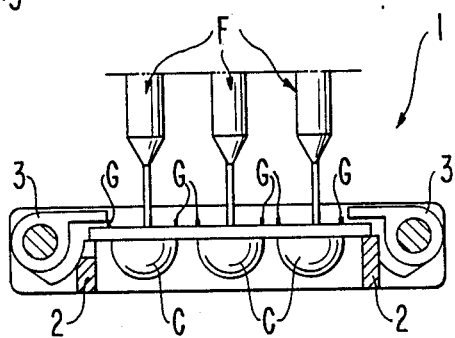
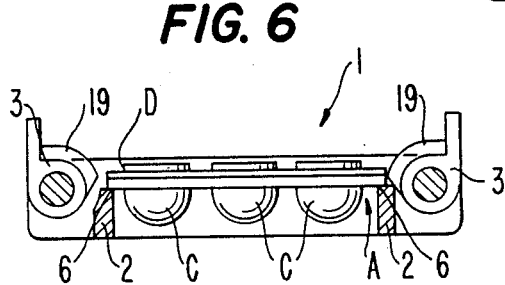
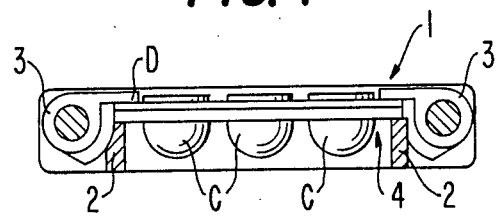
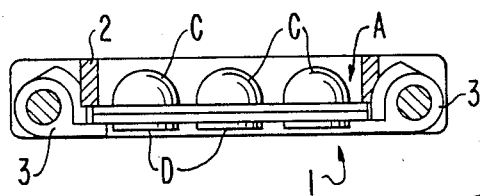
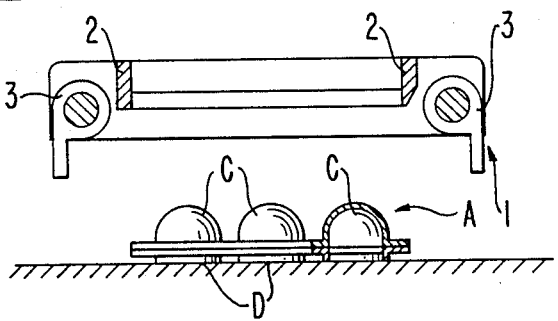

METHOD FOR THE MANUFACTURE OF CONFECTIONERY WAFER PRODUCTS

This is a division of application Ser. No. 109,151, filed Oct. 16, 1987, now U.S. Pat. No. 4,854,228.

The present invention relates to devices for the manufacture of food products and relates particularly to a device for the manufacture of food products made by joining together first and second wafers, in which at least the first wafer includes a substantially flat core part with a region having a distinct perimeter in which there are provided cell parts opening onto one face of the first wafer and generally closed on the other face of the first wafer.

The object of the present invention is to provide a device which enables food products having the characteristics indicated above to be made particularly simply and quickly on an industrial scale.

According to the present invention, this object is achieved by a device of the type specified above, characterised in that it comprises:

a peripheral frame extending along a path corresponding to said distinct perimeter and having an end edge which can cooperate with the said other face of the first wafer in correspondence with said distinct perimeter, and a plurality of clamping members associated with the peripheral frame and able to pivot relative to the frame between a closed position in which the clamping members extend so as at least partially to cover the end edge and clamp the first and second wafers on the device, and an open position in which the clamping members are disengaged from the end edge to allow the first and second wafers to be inserted in and removed from the device.

The invention also relates to a method for using a device having the characteristics specified above. The method of the invention is characterised in that it includes, in order, the steps of:

inserting the first wafer in the device with the clamping members kept in their open position, and bringing the other face of the first wafer into a position in which it bears on the end edge of the frame, inserting the second wafer in the device and joining it to the first wafer, bringing the clamping members into their closed positions and forcing the second wafer into the position of joining with the first wafer, and returning the clamping members to their open position and removing the two joined wafers from the device.

The invention will now described, purely by way of non-limiting example, with reference to the appended drawings, in which.

Figure 2:
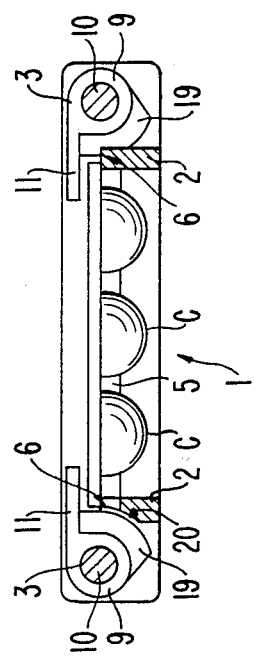
FIG. 2 is a section taken on the line II—II of FIG. 1.

FIGS. 4 to 9, which correspond essentially to the section of FIG. 2, illustrate schematically various successive steps in the method of use of the device of the invention.

In the appended drawings, a device (mould) for use in the manufacture of food products made by joining together first and second wafers, usually constituted by wafer sheets, is generally indicated 1.

One of these wafer sheets, in particular that which will be termed the first wafer in the rest of the description and in the following claims, is illustrated schematically in broken outline and indicated A in FIG. 1.

The wafer is constituted essentially by a sheet of wafer or like product having a generally rectangular external periphery with dimensions of about $29 \times 9$ cm.

A certain number (twenty-seven in the example illustrated) of cells C constituted by hemispherical cups which project from the flat part (generally termed the core part) B of the wafer A are formed in the wafer A (by known methods).

The cells C are all formed on the same side of the wafer A.

It can thus be stated that the wafer A comprises a substantially flat core part B with a region "having a distinct perimeter" (that is, a generally rectangular region with dimensions slightly less than the outer dimensions of the wafer A) in which cell parts C are provided which all open onto one face of the wafer A and are generally closed on the opposite or other face of the wafer A.

Figure 1:
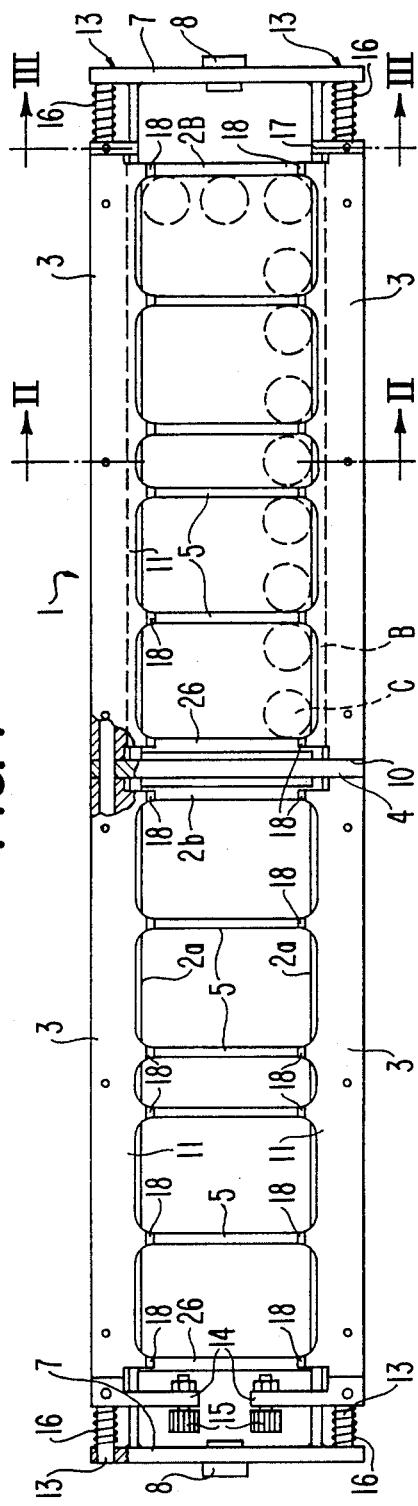
FIG. 1 is a plan view of a device according to the invention.
Figure 3:
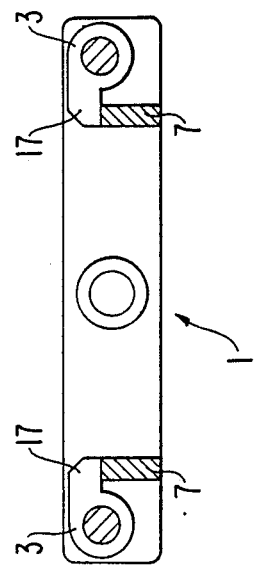
FIG. 3 is a section taken on the line III—III of FIG. 3.

The device or mould 1 illustrated in FIG. 1 is actually a double mould which can operate simultaneously on two wafers A such as that just described, illustrated in broken outline in the right-hand part of FIG. 1.

In general, the device 1, or each of its two parts in the case of the double device illustrated here, can be seen to be constituted essentially by:

a peripheral frame 2 which extends along a path corresponding to the path identified by the periphery in the region of the (or each) wafer A in which the cell parts C are provided; and a plurality of clamping members 3 associated with the frame 2 and pivotable relative to the frame 2 itself between a closed position, which is that illustrated in FIGS. 1, 2, 3, 5, 7 and 8 of the appended drawings, and an open position, illustrated in FIGS. 4, 6 and 9 of the same drawings.

In the embodiment illustrated here, the frame 2 has a general figure-of-eight shape. As seen, one is dealing with a double configuration intended to allow the simultaneous treatment of two wafers A. In practice, the frame 2 illustrated in FIG. 1 may be considered as deriving from the juxtaposition of two rectangular frames each of which comprises two longer sides 2a and two shorter sides 2b connected so as to form a single piece along two facing shorter sides 2b. More particularly, a transverse stiffening member of the frame, indicated 4 in FIG. 1, is interposed between the two facing shorter sides.

Further transverse stiffening members, constituted by circular-sectioned bars, indicated 5, extend so as to connect the longer sides 2a of both the frames and divide the generally rectangular space within each frame into a plurality of sectors or vessels.

As best seen in the sectional view of FIG. 2, each side 2a, 2b of the frame 2 can be seen to include an end edge 6 which extends along a path corresponding to the periphery of the region of the wafer A in which the cell parts C are provided.

Consequently, the end edge 6 can form a support surface for the peripheral portion of the wafer A, supporting it exactly around the periphery of the region in which the cells parts C are provided.

The transverse stiffening members 5 extend with one of their faces (or with one of their generatrices, when they are constituted by cylindrical bars) coplanar with the edge 6. The transverse stiffening members 5 are thus also able to support the flat core part B of the wafer A.

Naturally, in order to achieve this result, it is necessary for the transverse stiffening members 5 to extend along paths such as not to interfere with the cell parts C.

In the embodiment illustrated, intended for use in joining wafers A in which the cell parts C are arranged in straight lines, the transverse stiffening members 5 are straight and their positions are chosen so as not to interfere with any row of cells C.

Returning now to the plan view of FIG. 1, one can see that the frame 2 has appendage parts 7 at both ends which are generally $\pi$-shaped to allow them to support the frame 2 itself along the shorter, outer sides 2b, that is, the two opposing shorter sides 2b.

More particularly, take-up parts 8 in the form of bushes projecting outwardly of the frame 2 are provided in both end parts 7 in a generally barycentric position relative to the device 1. The bushes 8 can receive corresponding pins (not illustrated) of a take-up device which enables the device 1 to be lifted and, if need be, overturned about its central axis identified by the direction of alignment of the two bushes 8.

The clamping members 3, of which there are two (one for each longer side 2a) for each of the two parts of the double frame 8 illustrated here, are each constituted essentially (FIG. 2) by a tubular hub 9 keyed (rigidly) onto a corresponding shaft 10. Each hub 9 has a flange appendage 11 which extends approximately tangentially of the hub 9 in a position generally facing the end edge 6 of the frame 2.

As best seen in the plan view of FIG. 1, two shafts 10 are then provided, each of which extends along one of the two longer sides of the device 1 over the entire length of the device itself. Each shaft has two opposite ends rotatable in corresponding apertures 13 provided in the end parts 7.

On two homologous ends of the shafts 10, that is, the ends located adjacent one of the end parts 7, are two crank members 14 provided with rollers or cam follower members, indicated 15, the function of which is to cause pivoting of the crank members 14 and consequent rotation or pivoting of the shafts 10 on which the hubs 9 of the clamping members 3 are keyed.

The rotation of the shafts 10 and the consequent pivoting of the flange parts 11 of the clamping members 3 is effected between a closed angular position (FIGS. 1, 2, 3, 5, 7 and 8) in which the flanges 11 extend inwardly of the frame 2 so as to cover the end edges 6, being kept at a certain distance from the end edges 6, and an open position (FIGS. 4, 6 and 9) in which the flanges 11 open outwardly of the device 1 into positions approximately perpendicular to the plane of the end edges 6, being disengaged completely from the end edges 6.

The distance between the edge 6 and the flanges 11 in the closed position is selected so as to correspond to about twice the thickness of the core part B of the wafer A. The reason for this choice will become clearer in the description below.

Between the end parts 7 of the frame 2 and the corresponding ends of the shafts 10 are helical springs 16 which are torsionally stressed and which bias the shafts 10 to the angular position corresponding to the disposition of the flanges 11 in the closed position of FIGS. 1, 2, 5 and 7.

In other words, the springs 16 act as springs opposing the rotational movement which may be imparted to the shafts 10 by means of the crank members 14.

The orienting travel of the shafts 10 towards the closed position is limited by the abutment of two respective radial appendages 17 provided at the ends of the shafts 10 opposite the ends on which the crank members 14 are mounted against the structure of the corresponding end part 7 of the frame 2.

As is best seen in the plan view of FIG. 1, the flanges 11 have appendage parts 18 which extend inwardly of the frame in positions aligned with the smaller sides 2b of the frame and with the transverse reinforcing members 5. The function of the appendage parts 18 is to make the retaining and clamping action of the elements 3 more secure according to criteria which will be explained more fully below.

Preferably, the hubs 9 of the clamping members 11 have circumferential peripheral projections 19 in correspondence with the appendage parts 18 of the flanges 11 which, during pivoting of the clamping members 3, slide within corresponding recesses 20 provided in the longer sides 2a of the frame.

More particularly, when the clamping members 3 are in the open position (see particularly FIGS. 4 and 6), the peripheral projections 19 together define an ideal tapered or funnel-shaped surface which guides the wafers introduced into the device 1.

FIGS. 4 to 9 illustrate schematically the sequence of use of the device 1 described above when applied to the manufacture of a food product constituted by the above-described wafer A joined to a wafer D which, for the purposes of an explanation of the present invention, may be considered as essentially flat.

With specific reference to the manufacture of the food product described in the previous application to which reference is made in the introduction to the present specification, however, the wafer D is also constituted by a flat core part having an external periphery with dimensions identical to those of the external periphery of the wafer A, and a distinct internal peripheral region in which cell parts are provided, in this case constituted by cylindrical recesses of reduced height.

In the first phase of the process, the wafer A is inserted in the device 1 with the clamping members 1 kept in the open position. Under these conditions, the clamping members 3, and more precisely the flanges 11 thereof, are disengaged completely from the upper edge 6 of the frame (2) to enable the lower face of the core part B of the wafer A (that is, the face opposite that onto which the cell parts C open) to be brought into a position of rest on the edge 6 and on the parts of the transverse members 5 coplanar with this edge.

Subsequently (FIG. 5), the clamping elements 3 are moved into their closed position whereby the outer edge of the wafer A between the frame 2 and the flanges 11, and hence the wafer A in its entirety, is firmly held on the device 1.

The device 1 within the wafer (or wafers) clamped thereto can then be advanced to a pouring station F where a filling (such as a creamy or pasty mass) is poured into the cell parts C.

At the same time, spots of edible adhesive material, for example spots of chocolate G, may be applied to the upper face of the wafer A along the peripheries of the mouths of the cell parts C.

Once the filling or stuffing of the cell parts C has been completed, the clamping members 3 are returned to the open position (FIG. 6) and the other sheet D is applied in a frontally mating position on the wafer A.

The insertion of the second wafer D in a frontal mating position with the wafer A (particularly with regard to the precise frontal alignment of the cell parts which may be provided on both wafers) is facilitated by the presence of the peripheral projections 19 which, as seen, define a sort of tapered or funnel-shaped surface which enables the second wafer D to be guided safely and precisely into the mould.

At this point, the filled wafer product obtained being closed, the clamping members 3 are returned to the closed position (FIG. 7). The flanges 11 are then returned to the positions covering the peripheral edge 6 of the frame 2, to grip the peripheral parts of the two joined wafers between the edge 6 and the flanges 11 themselves.

For this reason, as described above, the distance between the peripheral edge 6 and the flanges 11 in the closed position is selected to be about equal to the overall thickness of the peripheral parts of the two wafers A and D, that is, in practice, equal to about twice the thickness of the peripheral part of the wafer A.

The closure of the clamping members 3 has the effect of forcing the two wafers A, D into a coupled position ensuring the firm closure of the product. The clamping members 3 being kept in the closed position, the device 1 with the wafer product within it may be forwarded to other working processes.

More particularly, the product may be passed through a cooling tunnel in order to consolidate the mass of filling within it and any weld sports G applied.

In particular, the device 1 with the product within it may be overturned through 180° about the axis defined by the bushes 8 so as to bring the second wafer D into a position below the first wafer. The requirement for carrying out this overturning operation may be due, for example, to a wish to make the products pass to and fro within a cooling tunnel so as to reduce the overall length of the cooling tunnel.

The device 1 still being kept in the overturned position, the clamping members 3 may finally be returned to the open position (FIG. 9). In this condition, the flanges 11 release the peripheral regions of the two wafers A, D joined together, whereby the produce formed by the two facing wafers leaves the device 1 and falls under gravity onto a receiving and conveying plane S.

I claim:

1. A method for the manufacture of food products, comprising:
    inserting a first wafer into a frame means for receiving and holding wafers, the first wafer comprising a perimeter portion bordering a core portion containing cells opening onto one face of the wafer and generally closed on another face of the wafer, and the frame means comprising frame members extending only along the perimeter of the wafer;
    inserting a second wafer into the frame means in a mating position with respect to the first wafer; and
    bonding together the first and second wafers to provide a unitary product.

2. A method according to claim 1 wherein said housing step comprises clamping together perimeter portions of the first and second wafers with clamping means pivoted about the frame members.

3. A method according to claim 1 wherein said bonding step comprises applying an edible adhesive to the perimeter portion of the first wafer.

4. A method according to claim 2 wherein said bonding step comprises applying an edible adhesive to the perimeter portion of the first wafer.

5. A method according to claim 1 wherein the second wafer comprises a perimeter portion bordering a core portion, the core portion containing cells opening onto one face of the wafer and generally closed on another face of the wafer.

6. A method according to claim 1 wherein the second wafer is substantially planar.

7. A method according to claim 1 further comprising at least partially filling the cells with an edible filling material.

8. A method according to claim 1 wherein the second wafer is inserted into the frame means in a position above the first wafer and subsequent to the bonding step, the unitary product is inverted.

* * * * *